(12) United States Patent
Fu et al.

(10) Patent No.: US 8,098,933 B2
(45) Date of Patent: Jan. 17, 2012

(54) METHOD AND APPARATUS FOR PARTITIONING AN OBJECT FROM AN IMAGE

(75) Inventors: Pengyu Fu, Shenyang (CN); Shanghai Su, Shenyang (CN); Huai Yuan, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 1100 days.

(21) Appl. No.: 11/938,633

(22) Filed: Nov. 12, 2007

(65) Prior Publication Data

US 2008/0118149 A1 May 22, 2008

(30) Foreign Application Priority Data

Nov. 17, 2006 (CN) .......................... 2006 1 0149453

(51) Int. Cl.
*G06K 9/00* (2006.01)
*G06K 9/34* (2006.01)
*G06K 9/46* (2006.01)
*G06K 9/66* (2006.01)

(52) U.S. Cl. ........ 382/173; 382/104; 382/106; 382/164; 382/180; 382/190

(58) Field of Classification Search .................. 382/104, 382/106, 164, 173, 180, 190
See application file for complete search history.

(56) References Cited

U.S. PATENT DOCUMENTS

2006/0136126 A1\* 6/2006 Coombes et al. ............. 701/208
2007/0154068 A1 7/2007 Stein et al.

FOREIGN PATENT DOCUMENTS

| CN | 101029824 | 9/2007 |
|----|-----------|--------|
| CN | 101030256 | 9/2007 |
| JP | 07-334799 | 12/1995 |
| JP | 08-320999 | 12/1996 |
| JP | 2003051008 A * | 2/2003 |
| JP | 2003-076987 | 3/2003 |
| JP | 2004-355139 | 12/2004 |

OTHER PUBLICATIONS

Thomanek, F.—"Multiple object recognition and scene interpretation for autonomous road vehicle guidance"—IEEE —Aug. 2002, pp. 231-236.\*

\* cited by examiner

*Primary Examiner* — Bernard Krasnic
(74) *Attorney, Agent, or Firm* — Brinks Hofer Gilson & Lione (57) ABSTRACT

A method and apparatus for partitioning an object from an image, such that substantially the entire object is contained in the partitioned region, includes pre-setting a reference width for the object; extracting a shadow underneath the object from the image and determining a candidate region containing the object in the image based on the extracted shadow underneath an object in the image; acquiring an imaging width of the reference width at the location of the extracted shadow underneath the object in the image, and adjusting the candidate region based on the imaging width of the reference width such that the adjusted candidate region substantially completely contains the object; and partitioning the adjusted candidate region as a region containing the object from the image.

18 Claims, 12 Drawing Sheets

METHOD AND APPARATUS FOR PARTITIONING AN OBJECT FROM AN IMAGE

RELATED APPLICATIONS

The present application claims priority to Chinese Patent Application Number 200610149453.6, filed Nov. 17, 2006, the entirety of which is hereby incorporated by reference.

BACKGROUND OF THE INVENTION

1. Field of the Invention

The present invention relates to the field of image recognition. More specifically, the present invention relates to a method and apparatus for partitioning an object from an image.

2. Description of the Related Art

In the field of machine vision based vehicle recognition systems, when recognizing a vehicle captured in an image taken by an image pickup device, such as a camera installed on a vehicle or other moving or fixed object, a region containing the vehicle (also referred to as ROI, or region of interest) is partitioned from the image. The vehicle is then recognized based on the partitioned region.

One of the most common techniques used to recognize vehicles in a partitioned image involves the use of a vehicle's shadow. All vehicles will cast a shadow when exposed to light, regardless of the shape or size of the vehicle. Thus, the shadow underneath a vehicle is an important feature for partitioning a region containing a vehicle from an image when using machine vision based vehicle image partitioning technology.

In the prior art, there are generally two methods used to partition a region containing a vehicle from an image based on the shadow underneath the vehicle. In the first method, the average gray scale value of the road surface in the image is calculated by recognizing that the gray scale value of the shadow underneath the vehicle is darker than the road surface. Next, using the average gray scale value of the road surface, all the regions with gray degree values lower than the average gray scale value are extracted as regions of the shadow underneath a vehicle. The region containing the vehicle is then partitioned using the regions corresponding to the shadow underneath the vehicle. In the second method, regions that are partially darker than their surroundings are extracted from an image as regions of the shadow underneath the vehicle. This is done because the region containing the shadow underneath the vehicle is always darker than the surrounding regions. The region containing the vehicle is then partitioned using the regions corresponding to the shadow underneath the vehicle. This method is described in detail in Japanese patent document 2003-76987 and in Chinese Patent Publication No. CN101030256A filed in Mar. 17, 2006, the entirety of which are hereby incorporated by reference.

Figure 1:
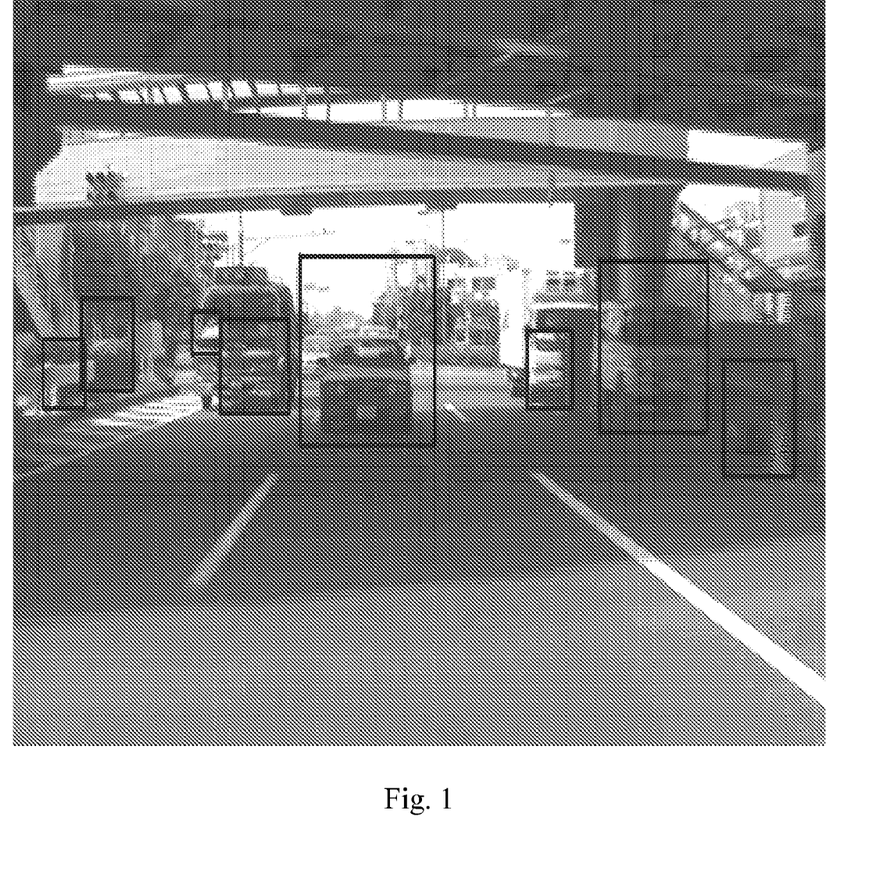
FIGS. 1-4 are examples of an incomplete shadow underneath a vehicle.
Figure 2:
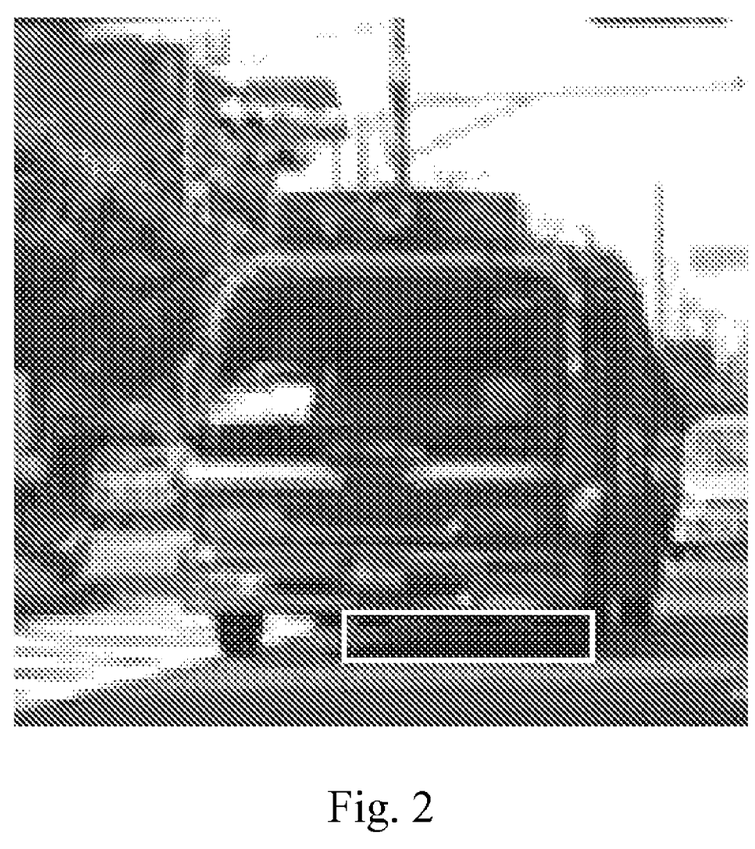
Figure 3:
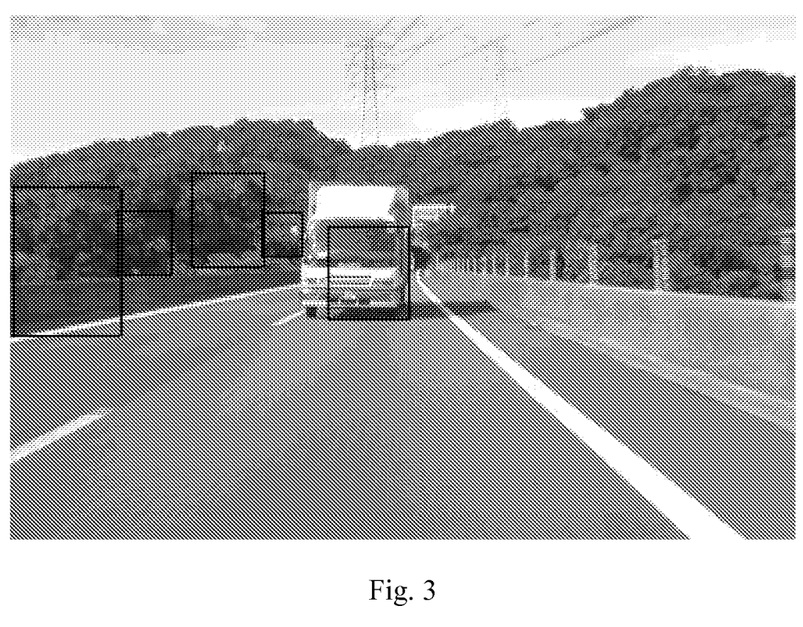
Figure 4:
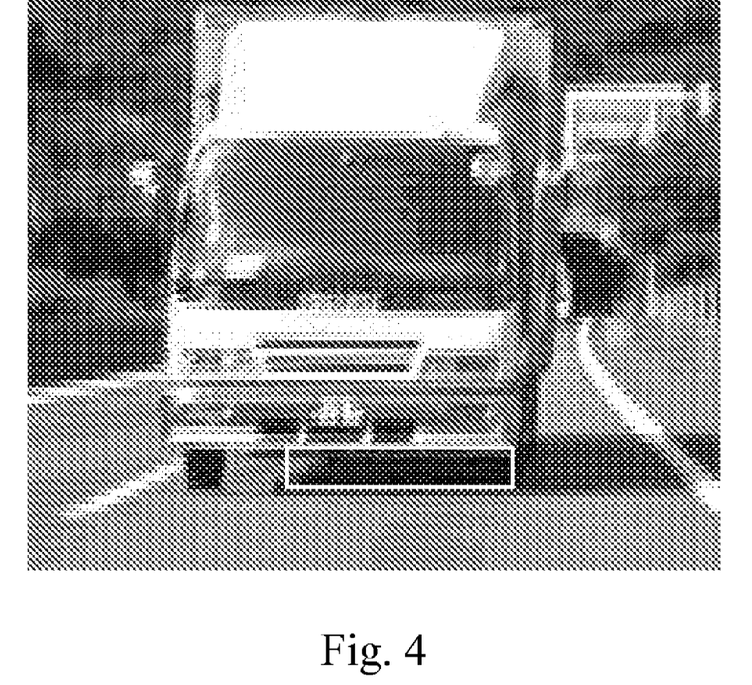
Figure 5:
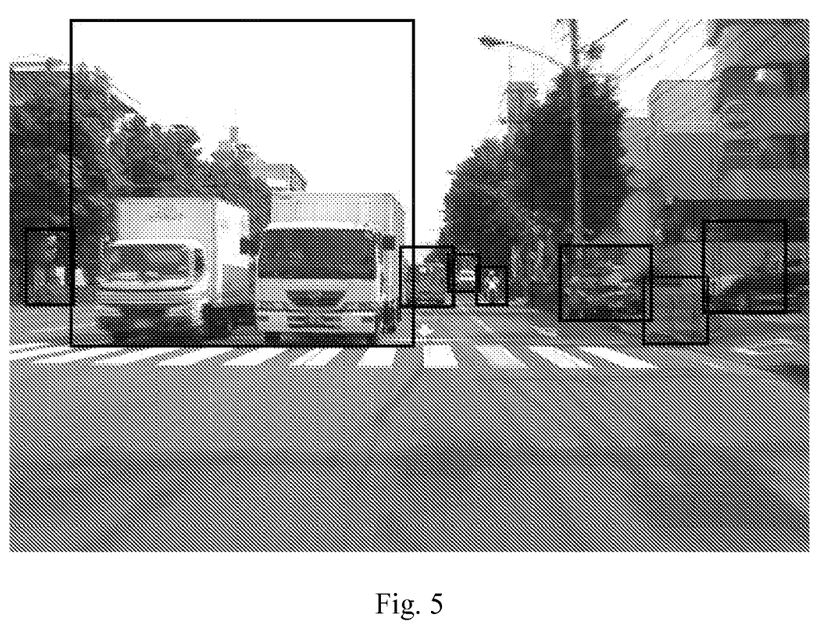
FIGS. 5-6 are examples of the shadow underneath a vehicle being combined with the shadow of another vehicle.
Figure 6:
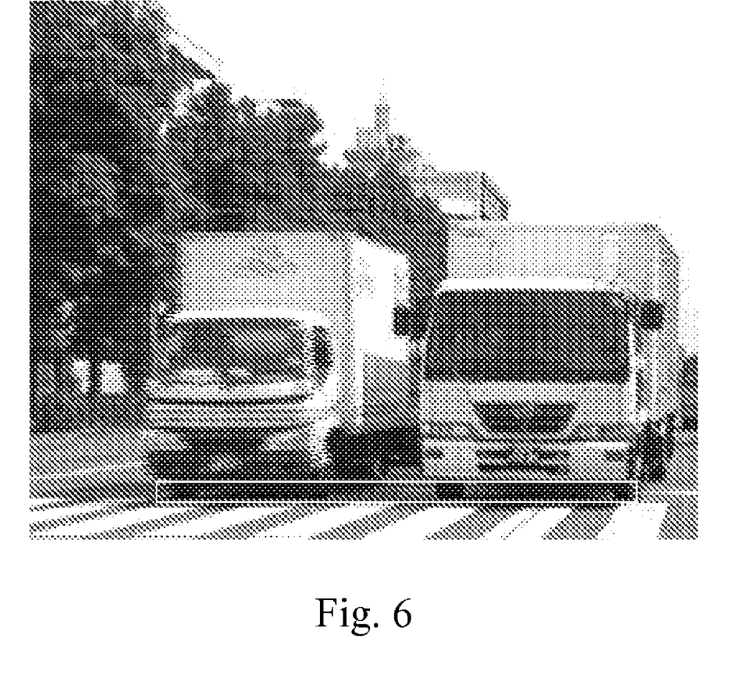

Due to the significant role the shadow underneath a vehicle plays in the art of vehicle image partitioning, the shadow underneath a vehicle has a significant effect on whether the region containing a vehicle can be partitioned from the image correctly. In some cases, the angle of incidence of light may cause the shadow underneath the vehicle to be incomplete. That is to say, the direction of the light source may affect the vehicle's shadow such that the shadow does not correspond to the actual dimensions or location of the vehicle. In this case, when the region containing the vehicle is partitioned from an image based on the shadow underneath the vehicle, the partitioned region only includes a portion of the vehicle, as shown in FIGS. 1-4. In other cases, if multiple vehicles are captured in the same image, the direction of the light source may cause the shadow underneath one vehicle to be combined with the shadow underneath another vehicle in the image. In this case, if the region partitioned from the image is based on the shadow underneath a vehicle, the partitioned region may comprise features of two or more vehicles, as shown in FIGS. 5-6.

In the case where the shadow is incomplete, the recognition system cannot recognize the vehicle correctly based on the partitioned region because the partitioned region does not include the entire vehicle. In the case where the shadows of two or more vehicles are combined, the recognition system may leave one of the vehicles unrecognized or incorrectly recognize multiple vehicles as one vehicle when determining the partitioned region. In both cases, the vehicle recognition system is unable to recognize the vehicle contained in the partitioned region correctly.

The problems mentioned above apply to machine-vision based vehicle recognition systems, as well as machine-vision based systems for recognizing objects such as pedestrians.

SUMMARY OF THE INVENTION

In view of the above problems, an object of the present invention is to provide a method and apparatus for more accurately partitioning an object from an image. In the present invention, a region containing a complete object can be extracted from an image, thus the system can correctly recognize the vehicle contained in the partitioned region.

In an embodiment of the present invention, initially, a reference width for the object is pre-set. The shadow beneath the object in the image is then extracted from the image, and a candidate region of the image containing the object is set.

Next, the system acquires an imaging width of the reference width at the location where the shadow underneath the object is extracted. The candidate region of the image, which is based on the imaging width of the reference width, is adjusted such that it substantially contains the complete object. Finally, the adjusted candidate region containing the object is partitioned from the image.

In order to implement the partitioning process described above, the present invention utilizes an apparatus that partitions an object from an image. An embodiment of this apparatus includes a setting unit, an extracting and determining unit, an acquiring unit, and an adjusting and partitioning unit.

The setting unit pre-sets the reference width for an object. The extracting and determining unit extracts a shadow located underneath the object, and then uses the extracted shadow to determine a candidate region containing the object. The acquiring unit then acquires an image width of the reference width at the location of the shadow extracted from the image.

The adjusting and partitioning unit adjusts the candidate region determined by the extracting and determining unit using the imaging width such that the candidate region substantially contains the complete object. Once the candidate region is adjusted, it is partitioned from the image.

In this embodiment, the setting unit communicates electronically with the extracting and determining unit. The extracting and determining unit communicates electronically with the acquiring unit, and the acquiring unit communicates electronically with the adjusting and partitioning unit.

DETAILED DESCRIPTION

Figure 7:
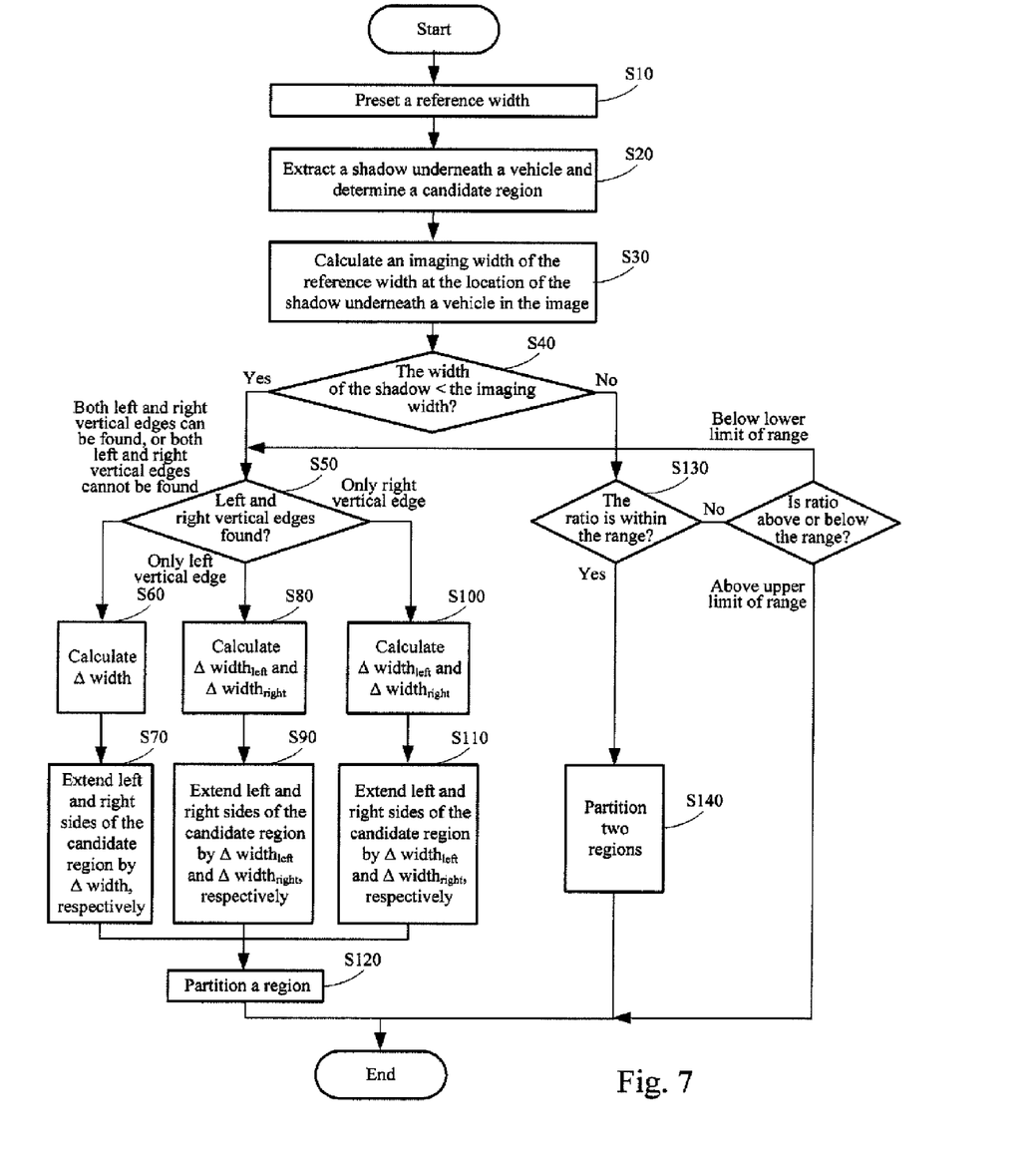
FIG. 7 is a flow chart of a method for partitioning an object from an image according to an embodiment of the present invention.
Figure 8A:
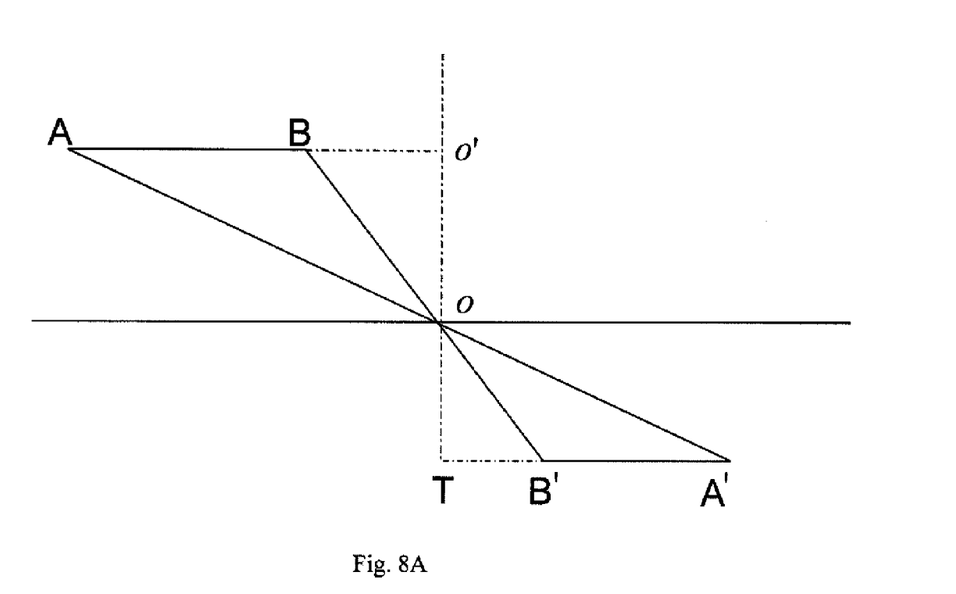
FIGS. 8A and 8B are schematic diagrams of calculating an imaging width of the maximum vehicle width using the pinhole imaging principle.
Figure 8B:
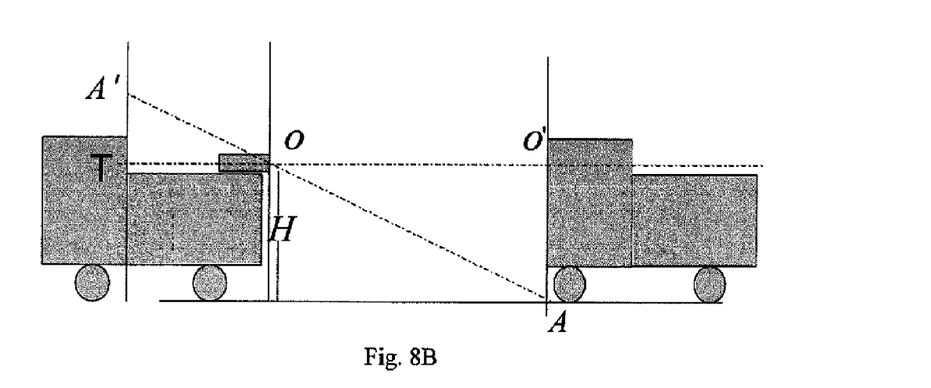

FIGS. 7-8B illustrate a method for partitioning an object from an image according to an embodiment of the present invention. More specifically, FIGS. 7-8B illustrate partitioning a region containing a vehicle from an image.

As shown in step S10 of FIG. 7, the reference width of the vehicle is set to the maximum vehicle width of normal vehicles running on the road. In general, the maximum vehicle width of a normal vehicle is about 2.5 m, but in actual application the maximum vehicle width may be set to a larger value, such as 2.8 m, to accommodate for calculation errors.

Next, in step S20, the shadow underneath a vehicle is extracted from an image picked up by a camera. A candidate region containing a vehicle in the image is then determined based on the extracted shadow. The shadow underneath the vehicle can be extracted from an image by using the methods disclosed in the aforementioned Japanese patent document 2003-76987 and Chinese Patent Publication No. 200610009379.8. However, this embodiment of the present invention is not limited to the methods disclosed in these documents, and the images may be extracted using other methods.

In step S30, the imaging width of the reference width (where the reference width is the maximum vehicle width of step S10) is calculated at the location of the shadow underneath the vehicle using the pinhole imaging principle.

FIGS. 8A and 8B show schematic diagrams for calculating the imaging width of the reference width (maximum vehicle width) based on the pinhole imaging principle. In FIG. 8A, AB is the maximum vehicle width, O'O is the shortest distance from the lens of the camera to the maximum vehicle width AB, A'B' is the pixel width (i.e. the imaging width) of the maximum vehicle width on the imaging device of the camera, and OT is the shortest distance from the image of the maximum vehicle width to the lens of the camera (equal to the focal length "f" of the camera). Using the pinhole imaging principle results in equation (1) below:

$$\frac{AB}{A'B' \times Ax} = \frac{O'O}{OT} \Rightarrow \frac{AB}{A'B' \times Ax} = \frac{O'O}{f} \Rightarrow A'B' = \frac{AB \times f}{O'O \times Ax} \quad (1)$$

where $A_x$ is the radial distortion of the camera.

In FIG. 8B, H is the distance from the camera to the ground, TA' is the pixel distance from the bottom edge of the actual vehicle in the image to the image vanishing line T. Using the pinhole imaging principle again yields equation (2) below:

$$\frac{H}{TA' \times Ay} = \frac{O'O}{OT} \Rightarrow \frac{H}{TA' \times Ay} = \frac{O'O}{f} \Rightarrow O'O = \frac{H \times f}{TA' \times Ay} \quad (2)$$

where $A_y$ is the tangential distortion of the camera, and O'O and OT are the same as O'O and OT in FIG. 8A. Combining equations (1) and (2) yields equation (3) below:

$$A'B' = \frac{AB \times TA' \times Ay}{H \times Ax} \quad (3)$$

In equation (3), Ax and Ay are known internal parameters of the camera, H may be measured in advance, and AB (the maximum vehicle width) is known. Thus, by taking different values of TA', the imaging widths A'B' of the maximum vehicle width at different locations in an image can be acquired using equation (3).

As shown in step S40, a determination is made as to whether the width of the shadow underneath the vehicle extracted in step S20 is less than the imaging width calculated in step S30.

In step S50, if the width of the extracted shadow underneath the vehicle S20 is determined to be less than the imaging width S30, a further determination is made as to whether the left and right vertical edges of the vehicle can be found near the left and right edges of the extracted shadow. A detailed description of the methods employed to search for the left and right vertical edges of the vehicle are described in Chinese Patent Publication No. CN101029824A filed Mar. 17, 2006, the entirety of which is hereby incorporated by reference, as well as other technical and patent documents.

In step S60, if the result of the further determination of step S50 is that both the left and right vertical edges of the vehicle can be found near the left and right edges of the extracted shadow, the $\Delta$width is calculated according to equation (4) below:

$$\Delta \text{width} = (\text{width}_{max} - \text{width}_{shadow})/2 \quad (4)$$

where the $\Delta \text{width}_{max}$ represents the imaging width of step S30 and $\Delta \text{Width}_{shadow}$ represents the width of the shadow of step S20.

Likewise, if neither the left nor right vertical edges of the vehicle can be found near the left and right edges of the extracted shadow, the $\Delta$width is calculated according to equation (4) above.

Next, in step S70, the outer edges of the left and right sides of the candidate region determined in step S20 are extended outwards (away from the center of the candidate region) by the $\Delta$width respectively.

However, in step S80, if the further determination of step S50 results in only the left vertical edge of the vehicle being found, $\Delta \text{width}_{left}$ and $\Delta \text{width}_{right}$ may be calculated based on the following equations (5) and (6):

$$\Delta \text{width}_{left} = \text{width}_{max} \times 0.05 \quad (5)$$

$$\Delta \text{width}_{right} = \text{width}_{max} - \text{width}_{shadow} \quad (6)$$

In step S90, once $\Delta \text{width}_{left}$ and $\Delta \text{width}_{right}$ have been calculated, the outer edges of the left side and right sides of the candidate region of step S20 are extended outwards (away from the center of the candidate region) by $\Delta \text{width}_{left}$ and $\Delta \text{width}_{right}$ respectively.

If the further determination of step S50 results in only the right vertical edge of the vehicle being found, $\Delta \text{width}_{left}$ and $\Delta \text{width}_{right}$ may be calculated in step S100 using the following equations (7) and (8) respectively:

$$\Delta \text{width}_{left} = \text{width}_{max} - \text{width}_{shadow} \quad (7)$$

$$\Delta \text{width}_{right} = \text{width}_{max} \times 0.05 \quad (8)$$

In Step S110 the outer edges of both the left and right sides of the candidate region S20 are then extended outwards (away from the center of the candidate region) by $\Delta \text{width}_{left}$ and $\Delta \text{width}_{right}$ respectively.

Figure 9:
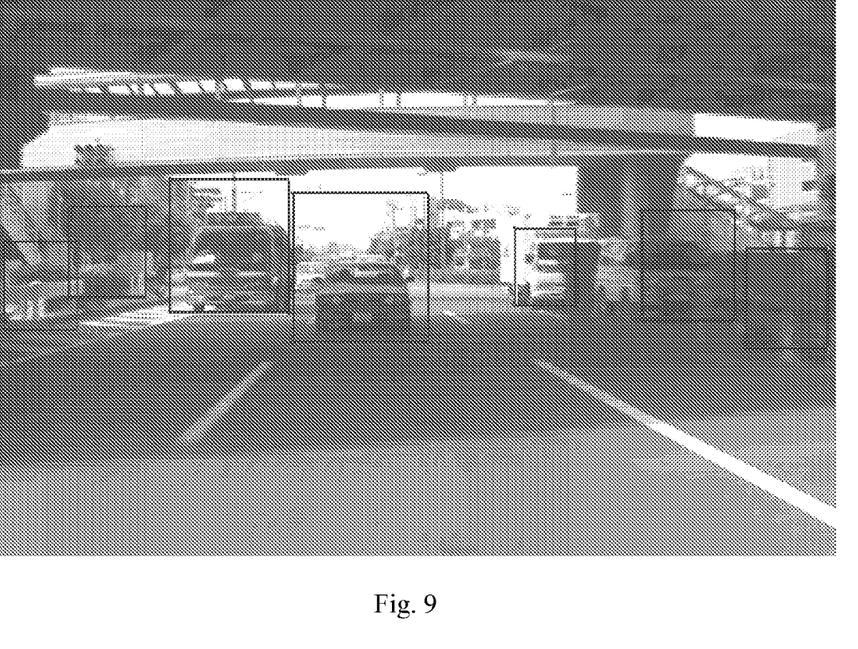
FIGS. 9 and 10 illustrate a method of partitioning a region containing a vehicle from an image.
Figure 10:
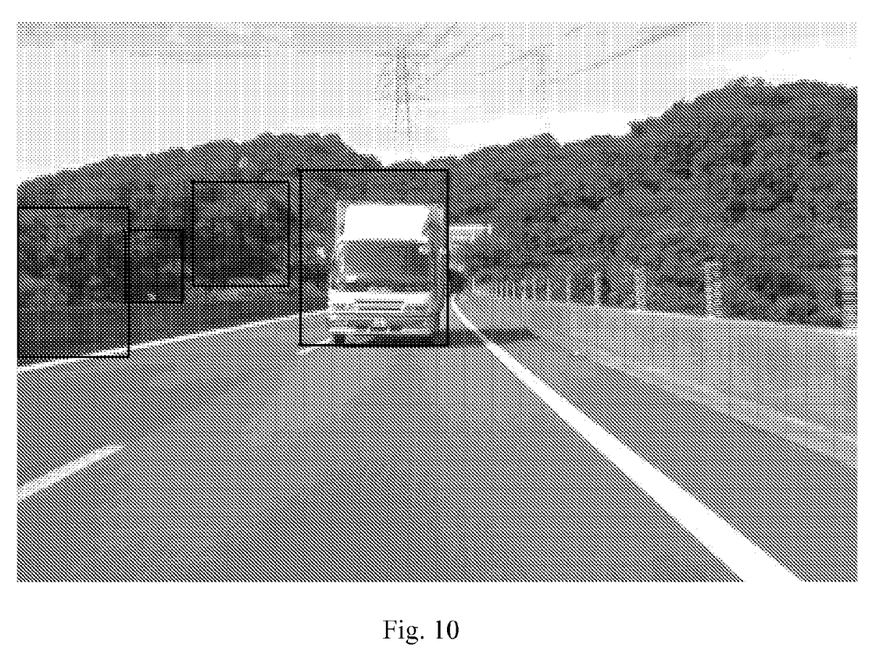

Next, in step S120, the region containing the vehicle is partitioned from the extended candidate region, as shown in FIGS. 9 and 10.

In step S130, if the result of the determination of step S40 is that the width of the shadow underneath the vehicle extracted in step S20 is greater than or equal to the imaging width of step S30, a further determination is made as to whether the ratio of the width of the extracted shadow of step S20 to the reference width of step S10 is within a predetermined range. An example of a predetermined range is between about 1.2 and about 2.5.

Generally, if the ratio of the shadow underneath a vehicle is larger than the maximum vehicle width, it indicates that two vehicles are located so close in proximity to one another that that their shadows have connected to one another. Moreover, the minimum vehicle width for normal vehicles is 1.5 m. Thus, when the shadows of two vehicles are connected together, the ratio of the width of the shadow underneath the vehicle to the maximum vehicle width is generally between about 1.2 and about 2.5.

Figure 11:
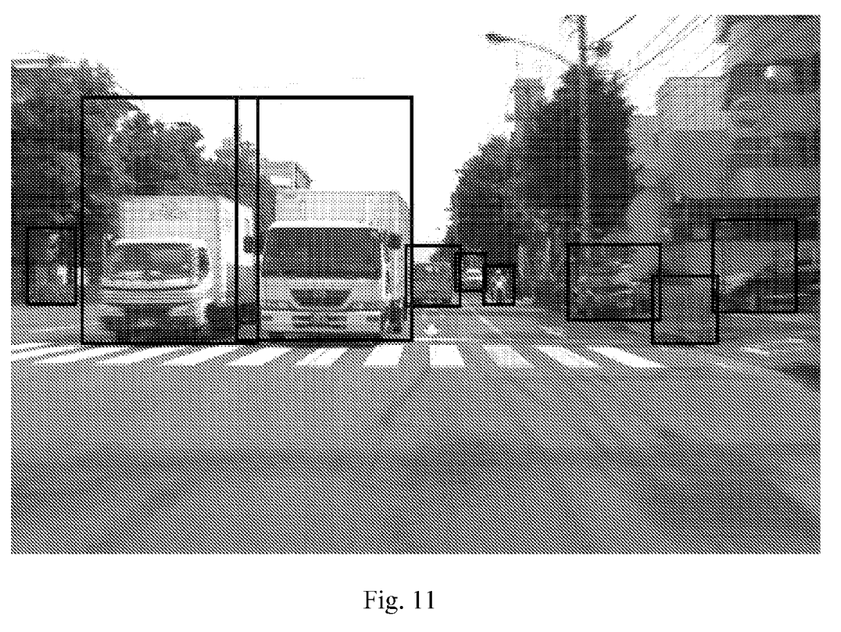
FIG. 11 shows a schematic diagram of a method of partitioning two regions containing a vehicle from an image.

In step S140, if the further determination result shows that the ratio is within the predetermined range, e.g. between about 1.2 and about 2.5, the region that is rightward from the left edge of the extracted shadow in the candidate region of step S20, is set to the imaging width of step S30. The candidate region is then partitioned as a region completely containing a first vehicle. Additionally, the region located leftward from the right edge of the extracted shadow in the candidate region is set to the imaging width of step S30, and is partitioned as a second region completely containing a second vehicle, as shown in FIG. 11.

When the further determination result shows that the ratio is outside the predetermined range, the system determines whether the ratio is greater than the upper limit of the predetermined range or less than the lower limit of the predetermined range. If the ratio is determined to be less than the lower limit of the predetermined range, e.g., less than about 1.2, the system proceeds to step 50 and a determination is made as to whether the left and right vertical edges of the vehicle can be found near the left and right edges of the extracted shadow underneath the vehicle. In the event the ratio is determined to be greater than the upper limit of the predetermined range, e.g., greater than about 2.5, the process proceeds to the end. Typically, when the ratio is greater than the upper limit of the predetermined range, it indicates that three or more vehicles are located in close proximity to each other. In this case, an edge of the vehicle is usually not located within the captured image, thus no vehicle is partitioned from the image.

In the method for partitioning an object from an image according to the embodiment of the present invention described above, if the shadow underneath a vehicle is less than the imaging width of the reference width, the sides of the candidate region are extended outward based on the imaging width of the reference width. Thus, the region that is partitioned from the image utilizing the extended candidate region contains the whole vehicle, and the recognition system correctly recognizes the vehicle contained in the partitioned region. In contrast, when the shadow underneath the vehicle is larger than the imaging width of the reference width and the ratio between them is within the predetermined range, two regions are partitioned. The first region is located inward from the right edge of the shadow, and is partitioned from the image as an area having the same width as the imaging width of the reference width. The second region is located inward from the left edge of the shadow, and is partitioned from the image as a region having the same width as the imaging width of the reference width. In this case, both of the partitioned regions include the entirety of a single vehicle. Thus, through this method the recognition system can correctly recognize individual vehicles based on the partitioned regions.

Alternative Embodiments

In the embodiments described above, the maximum vehicle width of normal vehicles running on the road is set to the reference width of the vehicle. However, the present invention is not limited to this technique and the reference width may be set to other widths as required.

Additionally, the present invention is not limited to the process described in steps S20 and S30 (extracting a shadow underneath a vehicle from an image picked up by a camera, determining a candidate region, and then directly calculating an imaging width of the maximum vehicle width at the location of the shadow underneath the vehicle using the pinhole imaging principle). Alternatively, a number of imaging widths may be pre-calculated using the pinhole imaging principle for the maximum vehicle width at a number of different locations in the image picked up by a camera. Next, the shadow underneath the vehicle is extracted from the image and the candidate region is determined. The imaging width of the maximum vehicle width at the location of the extracted shadow underneath the vehicle in the image is then retrieved from the number of pre-calculated imaging widths at the number of different locations.

Furthermore, the imaging width of the reference width may be calculated using other suitable methods, and is not limited to calculation based on the pinhole image principle.

Moreover, the present invention is not limited to partitioning vehicles from an image, and may be used for any object that casts a shadow, such as pedestrians.

Additionally, the method for partitioning an object from an image according to the present invention may be implemented by software, hardware or a combination thereof.

Figure 12:
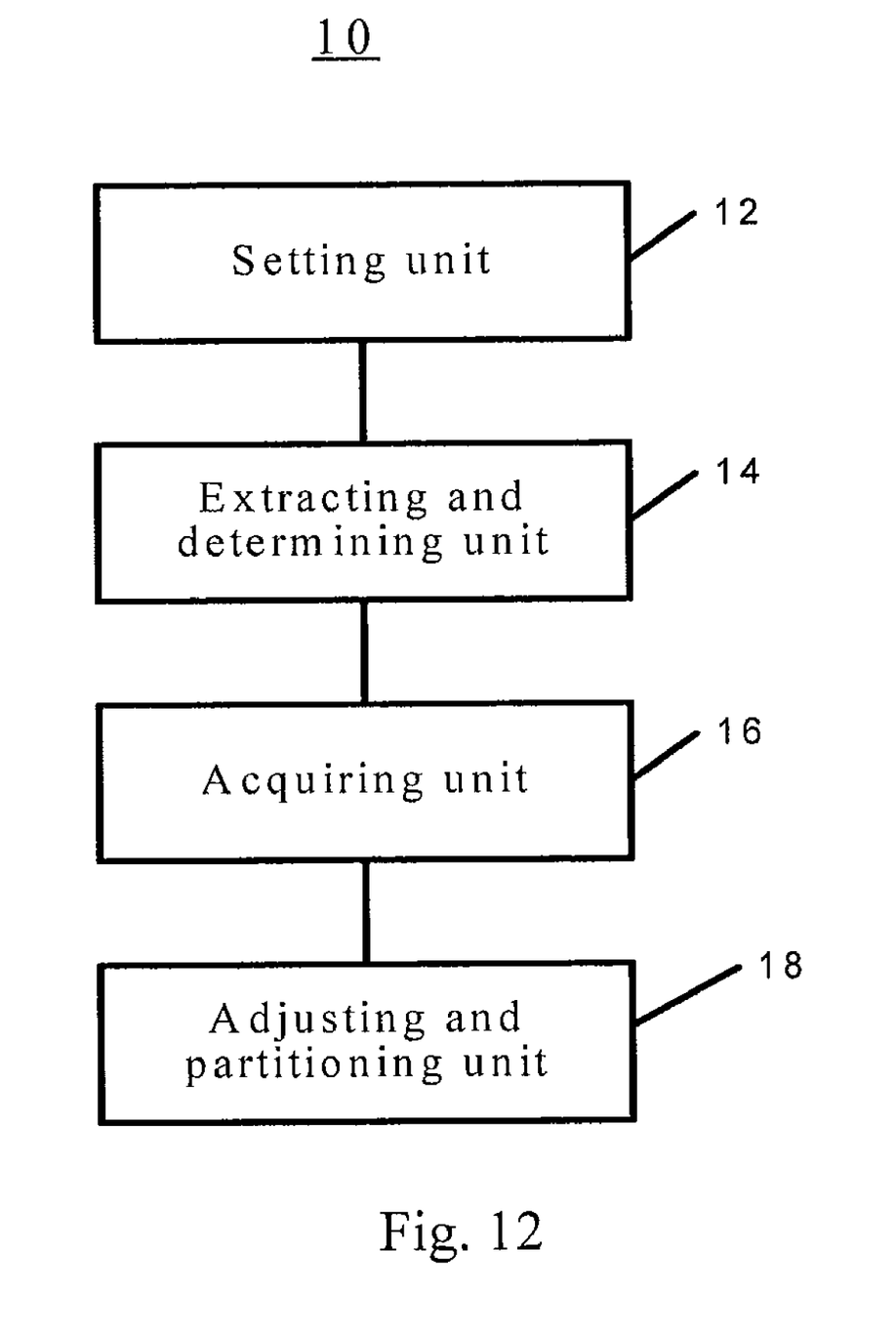
FIG. 12 illustrates a block diagram of an apparatus for partitioning an object from an image according to an embodiment of the present invention.

FIG. 12 shows an apparatus for partitioning an object from an image according to an embodiment of the present invention, which is implemented by using software, hardware, and their combination. FIG. 12 illustrates the components relevant to the invention.

As shown in FIG. 12, the embodiment of the apparatus 10 for partitioning an object from an image includes: a setting unit 12 for pre-setting a reference width for the object; an extracting and determining unit 14 for extracting a shadow underneath an object from the image and determining a candidate region containing the object from the image (based on the extracted shadow underneath the object); an acquiring unit 16 for acquiring an imaging width of the reference width at the location of the extracted shadow underneath the object in the image; and an adjusting and partitioning unit 18 for adjusting the determined candidate region according to the imaging width so that the adjusted candidate region substantially contains the complete object, and partitioning the adjusted region containing the object from the image.

In the apparatus 10 for partitioning an object from an image, the set unit 12 is in electronic communication with the extracting and determining unit 14. The extracting and determining unit 14 is in electronic communication with the acquiring unit 16, which is in electronic communication with the adjusting and partitioning unit 18.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method of partitioning an object from an image, the method comprising:
    pre-setting a reference width for an object;
    extracting a shadow underneath the object from an image;
    determining a candidate region containing the object in the image based on the extracted shadow underneath the object;
    acquiring an imaging width of the reference width at a location of the extracted shadow underneath the object in the image;
    adjusting the candidate region based on the imaging width of the reference width such that the adjusted candidate region substantially contains the object; and
    partitioning the adjusted candidate region as a region containing the object from the image,
    the method further comprising:
        determining whether the width of the extracted shadow underneath the object is less than the imaging width of the reference width at the location of the extracted shadow underneath the object in the image, and if the width of the extracted shadow underneath the object is less than the imaging width of the reference width at the location of the extracted shadow underneath the object in the image, the candidate region is adjusted to substantially contain the object by extending the candidate region based on a difference between the width of the extracted shadow underneath the object and the imaging width of the reference width at the location of the extracted shadow underneath the object in the image.

2. The method of partitioning an object from an image according to claim 1, the method further comprising:
    determining whether a left vertical edge of the object can be located near the left edge of the extracted shadow underneath the object in the image; and
    determining whether a right vertical edge of the object can be located near the right edge of the extracted shadow underneath the object in the image.

3. The method of partitioning an object from an image according to claim 2, wherein, if both the left and right vertical edges of the object can be found, the candidate region is adjusted to substantially contain the object by extending the left and right sides of the candidate region by one half the difference between the width of the extracted shadow underneath the object and the imaging width of the reference width.

4. The method of partitioning an object from an image according to claim 2, wherein, if neither the left nor right vertical edges of the object can be found, the candidate region is adjusted to substantially contain the object by extending the left and right sides of the candidate region by one half the difference between the width of the extracted shadow underneath the object and the imaging width of the reference width.

5. The method of partitioning an object from an image according to claim 2, further comprising:
    determining the difference between the width of the shadow underneath the object and the imaging width of the reference width;
    wherein, if only the right vertical edge of the object is found, the candidate region is adjusted to substantially contain the object by extending the left side of the candidate region outward by the difference between the width of the extracted shadow underneath the object and the imaging width of the reference width.

6. The method of partitioning an object from an image according to claim 5, wherein, if only the right vertical edge of the object is found, the right side of the adjusted candidate region is extended outward by a predetermined distance.

7. The method of partitioning an object from an image according to claim 2, further comprising:
    determining the difference between the width of the extracted shadow underneath the object and the imaging width of the reference width;
    wherein, if only the left vertical edge of the object can be found near the left edge of the extracted shadow underneath the object in the image, the candidate region is adjusted to substantially contain the object by extending the right side of the candidate region outward by the difference between the width of the shadow underneath the object and the imaging width of the reference width.

8. The method of partitioning an object from an image according to claim 7, wherein if only the left vertical edge of the object is found, the left side of the adjusted candidate region is extended outward by a predetermined distance.

9. The method of partitioning an object from an image according to claim 1, the method further comprising:
    determining whether a ratio of the width of the extracted shadow underneath the object to the imaging width of the reference width at the location of the extracted shadow underneath the object in the image is within a predetermined range, if the width of the shadow underneath the object is determined not to be less than the imaging width of the reference width at the location of the shadow underneath the object in the image; and
    partitioning a first region substantially containing a first object if the ratio is within the predetermined range, wherein the first region is located rightward from the left edge of the shadow underneath the object in the determined candidate region, and the width of the first region is the width of the imaging width of the reference width; and
    partitioning a second region substantially containing a second object if the ratio is within the predetermined range, wherein the second region is located leftward from the right edge of the shadow underneath the object in the candidate region, and the width of the second region is the width of the imaging width of the reference width.

10. The method according to claim 9, wherein the predetermined range is between about 1.2 and about 2.5.

11. The method of partitioning an object from an image according to claim 1, wherein the reference width is a maximum width of the object.

12. The method of partitioning an object from an image according to claim 1, wherein the object in the image includes a vehicle.

13. The method of partitioning an object from an image according to claim 1, the method further comprising, calculating the imaging width of the reference width at the location of the shadow underneath the object in the image.

14. The method of partitioning an object from an image according to claim 13, further comprising, calculating the imaging width of the reference width in the image using a pinhole imaging principle.

15. A method of partitioning an object from an image, the method comprising:
- pre-setting a reference width for an object;
- pre-calculating an imaging width of the reference width at a number of different locations in an image;
- extracting a shadow underneath the object from the image;
- determining a candidate region containing the object in the image based on the extracted shadow underneath the object;
- retrieving the pre-calculated imaging width of the reference width at the location of the extracted shadow underneath the object in the image;
- adjusting the candidate region based on the imaging width of the reference width such that the adjusted candidate region substantially contains the object; and
- partitioning the adjusted candidate region as a region containing the object from the image, the method further comprising:
- determining whether the width of the extracted shadow underneath the object is less than the imaging width of the reference width at the location of the extracted shadow underneath the object in the image, and if the width of the extracted shadow underneath the object is less than the imaging width of the reference width at the location of the extracted shadow underneath the object in the image, the candidate region is adjusted to substantially contain the object by extending the candidate region based on a difference between the width of the extracted shadow underneath the object and the imaging width of the reference width at the location of the extracted shadow underneath the object in the image.

16. The method of partitioning an object from an image according to claim 15, wherein the reference width is a maximum width of the object.

17. The method of partitioning an object from an image according to claim 15, the method further comprising, pre-calculating the imaging width of the reference width in the image using a pinhole imaging principle.

18. An apparatus for partitioning an object from an image, comprising:
- a setting unit for pre-setting a reference width for an object;
- an extracting and determining unit for extracting a shadow underneath the object from an image, and determining a candidate region containing the object in the image based on the extracted shadow underneath the object;
- an acquiring unit for acquiring an imaging width of the reference width at a location of the extracted shadow underneath the object in the image; and
- an adjusting and partitioning unit for adjusting the candidate region according to the imaging width of the reference width such that the adjusted candidate region substantially contains the object, and partitioning the adjusted candidate region as a region containing the object from the image, wherein the adjusting and partitioning unit determines whether the width of the extracted shadow underneath the object is less than the imaging width of the reference width at the location of the extracted shadow underneath the object in the image, and if the width of the extracted shadow underneath the object is less than the imaging width of the reference width at the location of the extracted shadow underneath the object in the image, the candidate region is adjusted to substantially contain the object by extending the candidate region based on a difference between the width of the extracted shadow underneath the object and the imaging width of the reference width at the location of the extracted shadow underneath the object in the image;
- wherein the extracting and determining unit is configured to communicate electronically with the setting unit, and the acquiring unit is configured to communicate electronically with the setting unit and the adjusting and partitioning unit.

* * * * *